United States Patent
Ting et al.

(10) Patent No.: US 7,437,523 B1
(45) Date of Patent: Oct. 14, 2008

(54) SYSTEM AND METHOD FOR ON-THE-FLY FILE FOLDING IN A REPLICATED STORAGE SYSTEM

(75) Inventors: Daniel Ting, Palo Alto, CA (US); Stephen Manley, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 378 days.

(21) Appl. No.: 10/423,392

(22) Filed: Apr. 25, 2003

(51) Int. Cl.
G06F 12/06 (2006.01)
(52) U.S. Cl. .................. 711/161; 711/162; 714/6
(58) Field of Classification Search ............ 711/162, 711/161, 156, 170, 165, 114, 112, 158; 714/6, 714/4; 707/204, 203, 205
See application file for complete search history.

(56) References Cited

U.S. PATENT DOCUMENTS

| | | | |
|---|---|---|---|
| 4,156,907 A | 5/1979 | Rawlings et al. |
| 4,399,503 A | 8/1983 | Hawley |
| 4,570,217 A | 2/1986 | Allen et al. |
| 4,598,357 A | 7/1986 | Swenson et al. |
| 4,688,221 A | 8/1987 | Nakamura et al. |
| 4,698,808 A | 10/1987 | Ishii |
| 4,761,785 A | 8/1988 | Clark et al. |
| 4,805,090 A | 2/1989 | Coogan |
| 4,837,675 A | 6/1989 | Bean et al. |
| 4,864,497 A | 9/1989 | Lowry et al. |
| 4,896,259 A | 1/1990 | Jacobs et al. |
| 4,899,342 A | 2/1990 | Potter et al. |
| 4,989,206 A | 1/1991 | Dunphy, Jr. et al. |
| 5,124,987 A | 6/1992 | Milligan et al. |
| RE34,100 E | 10/1992 | Hartness |
| 5,155,835 A | 10/1992 | Belsan |
| 5,163,131 A | 11/1992 | Row et al. |
| 5,202,979 A | 4/1993 | Hillis et al. |
| 5,278,979 A | 1/1994 | Foster et al. |
| 5,355,453 A | 10/1994 | Row et al. |
| 5,426,747 A | 6/1995 | Weinreb et al. |
| 5,485,579 A | 1/1996 | Hitz et al. |
| 5,581,724 A | 12/1996 | Belsan et al. |
| 5,802,366 A | 9/1998 | Row et al. |

(Continued)

FOREIGN PATENT DOCUMENTS

WO    WO 89/10594    11/1989

OTHER PUBLICATIONS

Administration Guide found at http://www.openafs.org/pages/doc/AdminGuide/auagd010.htm, visited on Mar. 2, 2005.

(Continued)

*Primary Examiner*—Pierre-Michel Bataille
(74) *Attorney, Agent, or Firm*—Cesari and McKenna, LLP

(57) ABSTRACT

A file folding technique reduces the number of duplicate data blocks of the file consumed on a storage device of a file server. According to the file folding technique, the "old" data blocks are being overwritten with "new" data and that new data is identical to the data of the "old" data, no write operation occurs. The invention reduces disk space consumption in a file server and also reduces the number of write operations directed to disks associated with the file server.

41 Claims, 9 Drawing Sheets

U.S. PATENT DOCUMENTS

| | | | |
|---|---|---|---|
| 5,819,292 | A | 10/1998 | Hitz et al. |
| 5,931,918 | A | 8/1999 | Row et al. |
| 5,941,972 | A | 8/1999 | Hoese et al. |
| 5,948,110 | A | 9/1999 | Hitz et al. |
| 5,950,225 | A | 9/1999 | Kleiman |
| 5,963,962 | A | 10/1999 | Hitz et al. |
| 6,038,570 | A | 3/2000 | Hitz et al. |
| 6,065,037 | A | 5/2000 | Hitz et al. |
| 6,138,126 | A | 10/2000 | Hitz et al. |
| 6,289,356 | B1 | 9/2001 | Hitz et al. |
| 6,425,035 | B2 | 7/2002 | Hoese et al. |
| 6,529,921 | B1* | 3/2003 | Berkowitz et al. ....... 715/500.1 |
| 6,574,591 | B1 | 6/2003 | Kleiman et al. |
| 6,636,879 | B1 | 10/2003 | Doucette et al. |
| 6,704,755 | B2* | 3/2004 | Midgley et al. ............. 707/204 |
| 6,748,504 | B2* | 6/2004 | Sawdon et al. ............. 711/162 |
| 6,826,666 | B2* | 11/2004 | Berkowitz et al. .......... 711/162 |
| 6,865,655 | B1* | 3/2005 | Andersen .................... 711/162 |
| 6,961,870 | B2* | 11/2005 | Chiu et al. .................... 714/11 |
| 6,993,539 | B2* | 1/2006 | Federwisch et al. ......... 707/201 |
| 7,043,485 | B2* | 5/2006 | Manley et al. ............. 707/100 |
| 2003/0074378 | A1* | 4/2003 | Midgley et al. ............. 707/204 |
| 2003/0182313 | A1* | 9/2003 | Federwisch et al. ......... 707/200 |
| 2004/0098425 | A1* | 5/2004 | Wiss et al. .................. 707/204 |

OTHER PUBLICATIONS

Basilico, et al., *Error Correction System Using "Shadow Memory,"* IBM Technical Disclosure Bulletin, May 1984, pp. 5792-5793.

Bitton, Dina, *Disk Shadowing*, Proceedings of the 14th VLDB Conference, LA, CA (1988).

Blasgen, M.W. et al., *System R: An architectural Overview*, Reprinted from IBM Systems Journal vol. 20, No. 1, 1981 © 1981, 1999.

Borenstein, Nathaniel S., *CMU's Andrew project a retrospective*, Communications of ACM, (39)12, Dec. 1996.

Brown, Mark R. et al., *The Alpine file system*, ACM Transactions on Computing Systems, 3(4):261-293, Nov. 1985.

Chen, Peter M., et al., *An Evaluation of Redundant Arrays of Disks Using an Amdahl 5890* Performance Evaluation, pp. 74-85, 1990.

Chutani, Sailesh, et al., *The Episode file system*, In Proceedings of the USENIX Winter 1992.

Clark, B.E., et al., *Application System/400 Performance Characteristics*, IBM Systems Journal, 28(3): 407-423, 1989.

Data Sheet for the Check Point Software Technologies product Flood-Gate-1 (1997).

Dibble, Peter C., et al., Beyond Striping: The Bridge Multiprocessor File System, Computer Science Department, University of Rochester, Aug. 11, 1989.

Douglis, Fred, et al., *A comparison of two distributed systems: Amoeba and Sprite*—Computing Systems, 4(4), Fall 1991, pp. 353-385 ?{copy of article I have has no date or cite}.

Gait, Jason, *Phoenix: A Safe In-Memory File System*. Communications of the ACM, 33(1):81-86, Jan. 1990.

Hartman, John H. et al., *Performance Measurements of a Multiprocessor Sprite Kernel*, Proceedings of the USENIX Conference, 1990.

Hitz, Dave et al., *File System Design for an NFS File Server Appliance*, Technical Report 3002, Rev. C395, presented Jan. 19, 1994.

Howard, John H, et al. *Scale and Performance in a Distributed File System*, Carnegie Mellon University, CMU-ITC-87-068, Aug. 5, 1987.

Howard, John, H. et al., *Scale and performance in a distributed file system*, ACM Trans. Computer. System., 6(1), Feb. 1988 pp. 51-81.

Isomaki, Markus, *Differentiated Service for the Internet*, Department of Technical Physics and Mathematics, May 9, 1998.

Kazar, Michael L., et al., *Decorum File System Architectural Overview*, USENIX Summer Conference, Anaheim, California, 1990.

Lorie, Raymond, A, *Physical integrity in a large segmented database*, ACM Trans. Database Systems, (2)1:91-104, Mar. 1977.

Lorie, RA, *Shadow Page Mechanism*, IBM Technical Disclosure Bulletin, Jun. 1986, pp. 340-342.

McKusick, Marshall Kirk, et al., *A Fast File System for UNIX*, Computer Science Division, Department of Electrical Engineering and Computer Sciences, Univ. of CA, Berkley, Feb. 18, 1994.

Miller, Ethan L., et al., *RAMA:A File System for Massively Parallel Computers*, 12th IEEE Symposium on Mass Storage Systems, Monterey CA, Apr. 1993, pp. 163-168.

Moons, Herman et al., *Location-Independent Object Invocation in Open Distributed Systems*, Autumn 1991 EurOpen Technical Conference and Exhibition, pp. 287-300 (Sep. 16-20, 1991).

Muller, Keith, et al., *A High Performance Multi-Structured File Systems Design*, In Proceedings of the 13th ACM Symposium on Operating Systems Principles, Oct. 1991, pp. 56-67.

Moons, Herman et al., *Location-Independent Object Invocation in Open Distributed Systems*, Autumn 1991 EurOpen Technical Conference and Exhibition, pp. 287-300 (Sep. 16-20, 1991).

Muller, Keith, et al., *A High Performance Multi-Structured File System Design*, In Proceedings of the 13th ACM Symposium on Operating Systems Principles, Oct. 1991, pp. 56-67.

Ousterhout, John K. et al., *The Sprite Network Operating System*, Computer Science Division, Department of Electrical Engineering and Computer Sciences, Univ. of CA, Berkley, Nov. 19, 1987.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Ousterhout, John, *Why Aren't Operating Systems Getting Faster as Fast as Hardware?*, Digital WRL Technical Note TN-11, Oct. 1989.

Ousterhout, John, *A Brief Retrospective On The Sprite Network Operating System*, found at http://www.cs.berkeley.edu/projects/sprite/retrospective.html,visited on Mar. 11, 2005.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).

Patterson, D. et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).

Peterson, Zachary Nathaniel Joseph, *Data Placement for Copy-on-Write Using Virtual Contiguity*, University of CA, Santa Cruz, Master of Science in Computer Science Thesis, Sep. 2002.

Quinlan, Sean, *A Cached WORM File System*, Software-Practice and Experience, 21(12):1289-1299 (1991).

Redundant Array of Independent Disks, from Wikipedia, the free encyclopedia, found at http://en.wikipedia.org/wiki/RAID, visited on Mar. 9, 2005.

Rosenberg, J., et al., *Stability in a Persistent Store Based on a Large Virtual Memory*, In Security and Persistence, Rosenber, J. & Keedy, J.L. (ed), Springer-Verlag (1990) pp. 229-245.

Rosenblum, Mendel, et al., *The LFS Storage Manager*, Computer Science Division, Electrical Engin. And Computer Sciences, Univ. of CA, presented at Summer '90 USENIX Technical Conference, Anaheim, CA Jun. 1990.

Rosenblum, Mendel, et al, The *Design and Implementation of a Log-Structured File System* Jul. 24, 1991 pp. 1-15.

Rosenblum, Mendel, et al., *The Design and Implementation of a Log-Structured File System*, , In Proceedings of ACM Transactions on Computer Systems, (10)1:26-52, Feb. 1992.

Sandberg, Russel et al., *Design and implementation of the Sun Network Filesystem*. In Proc. Summer 1985 USENIX Conf., pp. 119-130, Portland OR (USA), Jun. 1985.

Santry, Douglas S., et al., *Deciding When to Forget in the Elephant File System*, Operating Systems Review, 34(5), (Dec. 1999) pp. 110-123.

Satyanarayanan, M., et al., *The ITC Distributed File System: Principles and Design*, In Proceedings of the 10th ACM Symposium on Operating Systems Principles, (19)5:56-67, Dec. 1985.

Satyanarayanan,.M.. *A survey of distributed file-systems*. Annual Review of Computing Science, 4(73-104), 1989.

Satyanarayanan, M., et al, *Coda: A highly available file system for a distributed workstation environment*. IEEE Transactions on Computers, 39(4):447-459, 1990.

Satyanarayanan, Mahadev, *Scalable, Secure, and Highly Available Distributed File Access*, Computer May 1990: 9-21.

Sidebotham, Bob, *Volumes: The Andrew File System Data Structuring Primitive*, EEUG Conference Proceedings, Manchester, UK, Autumn 1986.

User Guide found at http://www.openafs.org/pages/doc/UserGuide/auusg004.htm, visited on Mar. 2, 2005.

Welch, Brent B., et al., *Pseudo Devices: User-Level Extensions to the Sprite File System*, Computer Science Division, Department of Electrical Engineering and Computer Sciences, Univ. of CA, Berkley, Apr. 1988.

Welch, Brent B., et al., *Pseudo-File-Systems*, Computer Science Division, Department of Electrical Engineering and Computer Sciences, Univ. of CA, Berkley, Oct. 1989.

Wittle, Mark, et al., *LADDIS: The next generation in NFS file server benchmarking*, USENIX Association Conference Proceedings, Apr. 1993.

Akyurek, Sedat, *Placing Replicated Data to Reduce Seek Delays*, Department of Computer Science, University of Maryland, UMIACS-TR-91-121, CS-TR-2746, Aug. 1991.

Bitton, Dina, *Disk Shadowing*, Proceedings of the 14th VLDB Conference, LA, CA 1988.

Chaudhuri, Surajit, et al., *Self-Tuning Technology in Microsoft SQL Server*, Data Engineering Journal 22, 2 1999 pp. 20-27.

Chutani, Sailesh, et al., *The Episode File System*, In Proceedings of the USENIX Winter 1992.

Coyne, Robert A., et al., *Storage Systems for National Information Assets*, Proc. Supercomputing 92, Minneapolis, Nov. 1992, pp. 626-633.

Finlayson, Ross S., et al., *Log Files: An Extended File Service Exploiting Write-Once Storage* Department of Computer Science, Stanford University, Report No. STAN-CS-87-1177, Sep. 1987.

Gray, Jim, et al., *The Recovery Manager of the System R Database Manager*, ACM Computing Surveys, (13)2:223-242 1981.

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITC-88-062 1988.

Howard, John, H. et al., *Scale and Performance in a Distributed File System*, ACM Trans. Computer System, 6(1), Feb. 1988 pp. 51-81.

Kazar, Michael Leon, *Synchronization and Caching Issues in the Andrew File System*, Carnegie Mellon University, CMU-ITC-88-063.

Kazar, Michael L., et al., *DEcorum File System Architectural Overview*, USENIX Summer Conference, Anaheim, California, 1990.

Kemper, Alfons, et al., *Performance Tuning for SAP R/3*, Data Engineering Journal 22, 2 1999 pp. 33-40.

Kent, Jack et al., *Optimizing Shadow Recovery Algorithms*, IEEE Transactions on Software Engineering, 14(2): 155-168, Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104.

Patterson, D., et al., *A Case for Redundant Arrays for Inexpensive Disks (RAID)*, Technical Report, CSD-87-391, Computer Science Division, Electrical Engineering and Computer Sciences, University of California at Berkeley 1987.

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 Sep. 1988.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached WORM File System*, Software-Practice and Experience, 21(12):1289-1299 1991.

Rosenblum, Mendel, et al., *The LFS Storage Manager*, Computer Science Division, Electrical Engineering And Computer Sciences, Univ. of CA, presented at Summer '90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Stuctured File System*, 1992, pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal 22, 2 1999 pp. 12-19.

Seltzer, Margo I., et al., *Journal Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal 22, 2 1999 pp. 41-47.

Subramanian, Muralidhar, et al., *Performance Challenges in Object-Relational DBMSs*, Data Engineering Journal 22, 2 1999 pp. 28-32.

Weikum, Gerhard, et al., *Towards Self-Tuning Memory Management for Data Servers*, Data Engineering Journal 22, 2 1999 pp. 3-11.

West, Michael, et al., *The ITC Distributed File System: Prototype and Experience*, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

U.S. Appl. No. 09/127,497, filed Nov. 22, 2001, Steven R. Kleiman et al.

U.S. Appl. No. 09/932,578, filed Jun. 27, 2002, Blake Lewis et al.

U.S. Appl. No. 09/891,195, filed Dec. 2002, Kayuri Patel et al.

U.S. Appl. No. 10/100,434, filed Sep. 2003, Raymond C. Chen et al.

U.S. Appl. No. 10/100,967, filed Sep. 2003, Michael L. Federwisch et al.

U.S. Appl. No. 10/126,822, filed Apr. 2002, Michael L. Federwisch et al.

U.S. Appl. No. 10/100,879, filed Sep. 2003, Stephen L. Manley et al.

U.S. Appl. No. 10/100,950, filed Sep. 2003, Stephen L. Manley et al.

U.S. Appl. No. 10/104,694, filed Sep. 2003, Andy C. Kahn et al.

David Hitz et al. TR3002 File System Design for a NFS File Server Appliance published by Network Appliance, Inc., Jul. 9, 2001.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

Fielding et al. (1999) Request for Comments (RFC) 2616, HTTP/1.1.

\* cited by examiner

SYSTEM AND METHOD FOR ON-THE-FLY FILE FOLDING IN A REPLICATED STORAGE SYSTEM

RELATED APPLICATIONS

This application is related to the following United States patent applications:

Ser. No. 10/100,950 entitled, SYSTEM AND METHOD FOR ASYNCHRONOUS MIRRORING OF SNAPSHOTS AT A DESTINATION USING A PURGATORY DIRECTORY AND INODE MAPPING, by Stephen L. Manley, et al. the teachings of which are expressly incorporated herein by reference;

Ser. No. 10/100,434, entitled SYSTEM AND METHOD FOR REDIRECTING ACCESS TO A REMOTE MIRRORED SNAPSHOT, by Raymond C. Chen, et al., the teachings of which are expressly incorporated herein by reference;

Ser. No. 10/100,879, entitled FORMAT FOR TRANSMISSION OF FILE SYSTEM INFORMATION BETWEEN A SOURCE AND A DESTINATION, by Stephen L. Manley, et al., the teachings of which are expressly incorporated herein by reference;

Ser. No. 10/100,967, entitled SYSTEM AND METHOD FOR DETERMINING CHANGES IN TWO SNAPSHOTS AND FOR TRANSMITTING CHANGES TO A DESTINATION SNAPSHOT, by Michael L. Federwisch, et al., the teachings of which are expressly incorporated herein by reference; and Ser. No. 10/126,822, entitled SYSTEM AND METHOD FOR CHECKPOINTING AND RESTARTING AN ASYNCHRONOUS TRANSFER OF DATA BETWEEN A SOURCE AND DESTINATION SNAPSHOT, by Michael L. Federwisch, et al., the teachings of which are expressly incorporated herein by reference; and Ser. No. 10/104,694, entitled FILE FOLDING TECHNIQUE, by Andy C. Kahn, et al., the teachings of which are expressly incorporated herein by reference.

FIELD OF THE INVENTION

This invention relates to file systems and more particularly to a technique for reducing disk write operations of a file server.

BACKGROUND OF THE INVENTION

A file server is a computer that provides file service relating to the organization of information on storage devices, such as disks. The file server or filer includes a storage operating system that implements a file system to logically organize the information as a hierarchical structure of directories and files on the disks. Each "on-disk" file may be implemented as a set of data structures, e.g., disk blocks, configured to store information. A directory, on the other hand, may be implemented as a specially formatted file in which information about other files and directories are stored.

A filer may be further configured to operate according to a client/server model of information delivery to thereby allow many clients to access files stored on a server, e.g., the filer. In this model, the client may comprise an application, such as a database application, executing on a computer that "connects" to the filer over a direct connection or computer network, such as a point-to-point link, shared local area network (LAN), wide area network (WAN), or virtual private network (VPN) implemented over a public network such as the Internet. Each client may request the services of the file system on the filer by issuing file system protocol messages (in the form of packets) to the filer over the network.

A common type of file system is a "write in-place" file system, an example of which is the conventional Berkeley fast file system. By "file system" it is meant generally a structuring of data and metadata on a storage device, such as disks, which permits reading/writing of data on those disks. In a write in-place file system, the locations of the data structures, such as inodes and data blocks, on disk are typically fixed. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers in the inode, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ software, residing on the filer, that processes file-service requests from network-attached clients.

As used herein, the term "storage operating system" generally refers to the computer-executable code operable on a computer that manages data access and may, in the case of a filer, implement file system semantics, such as the Data ONTAP™ storage operating system, implemented as a microkernel, and available from Network Appliance, Inc. of Sunnyvale, Calif., which implements a Write Anywhere File Layout (WAFL™) file system. The storage operating system can also be implemented as an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. In the example of a WAFL file system, a RAID 4 implementation is advantageously employed. This implementation specifically entails the striping of data across a group of disks, and separate parity caching within a selected disk of the RAID group. As described herein, a volume typically comprises at least one data disk and one associated parity disk (or possibly data/parity partitions in a single disk) arranged according to a RAID 4, or equivalent high-reliability, implementation.

In order to improve reliability and facilitate disaster recovery in the event of a failure of a filer, its associated disks or some portion of the storage infrastructure, it is common to "mirror" or replicate some or all of the underlying data and/or the file system that organizes the data. In one example, a mirror is established and stored at a remote site, making it more likely that recovery is possible in the event of a true disaster that may physically damage the main storage location or it's infrastructure (e.g. a flood, power outage, act of war, etc.). The mirror is updated at regular intervals, typically set by an administrator, in an effort to catch the most recent changes to the file system. One common form of update involves the use of a "snapshot" process in which the active file system at the storage site, consisting of inodes and blocks, is captured and the "snapshot" is transmitted as a whole, over a network (such as the well-known Internet) to the remote storage site. Generally, a snapshot is an image (typically read-only) of a file system at a point in time, which is stored on the same primary storage device as is the active file system and is accessible by users of the active file system. By "active file system" it is meant the file system to which current input/output operations are being directed. The primary storage device, e.g., a set of disks, stores the active file system, while a secondary storage, e.g. a tape drive, may be utilized to store backups of the active file system. Once snapshotted, the active file system is reestablished, leaving the snapshotted version in place for possible disaster recovery. Each time a snapshot occurs, the old active file system becomes the new snapshot, and the new active file system carries on, recording any new changes. A set number of snapshots may be retained depending upon various time-based and other criteria. The snapshotting process is described in further detail in U.S. patent application Ser. No. 09/932,578, entitled INSTANT SNAPSHOT by Blake Lewis et al., which is hereby incorporated by reference as though fully set forth herein. In addition, the native Snapshot™ capabilities of the WAFL file system are further described in *TR3002 File System Design for an NFS File Server Appliance* by David Hitz et al., published by Network Appliance, Inc., and in commonly owned U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., which are hereby incorporated by reference.

The complete recopying of the entire file system to a remote (destination) site over a network may be quite inconvenient where the size of the file system is measured in tens or hundreds of gigabytes (even terabytes). This full-backup approach to remote data replication may severely tax the bandwidth of the network and also the processing capabilities of both the destination and source filer. One solution has been to limit the snapshot to only portions of a file system volume that have experienced changes. Hence, FIG. 1 shows a prior art volume-based mirroring where a source file system 100 is connected to a destination storage site 102 (consisting of a server and attached storage—not shown) via a network link 104. The destination 102 receives periodic snapshot updates at some regular interval set by an administrator. These intervals are chosen based upon a variety of criteria including available bandwidth, importance of the data, frequency of changes and overall volume size.

In brief summary, the source creates a pair of time-separated snapshots of the volume. These can be created as part of the commit process in which data is committed to non-volatile memory in the filer or by another mechanism. The "new" snapshot 110 is a recent snapshot of the volume's active file system. The "old" snapshot 112 is an older snapshot of the volume, which should match the image of the file system replicated on the destination mirror. Note, that the file server is free to continue work on new file service requests once the new snapshot 112 is made. The new snapshot acts as a checkpoint of activity up to that time rather than an absolute representation of the then-current volume state. A differencer 120 scans the blocks 122 in the old and new snapshots. In particular, the differencer works in a block-by-block fashion, examining the list of blocks in each snapshot to compare which blocks have been allocated. In the case of a write-anywhere system, the block is not reused as long as a snapshot references it, thus a change in data is written to a new block. Where a change is identified (denoted by a presence or absence of an 'X' designating data), a decision process 200, shown in FIG. 2, in the differencer 120 decides whether to transmit the data to the destination 102. The process 200 compares the old and new blocks as follows: (a) Where data is in neither an old nor new block (case 202) as in old/new block pair 130, no data is available to transfer (b) Where data is in the old block, but not the new (case 204) as in old/new block pair 132, such data has already been transferred, (and any new destination snapshot pointers will ignore it), so the new block state is not transmitted. (c) Where data is present in the both the old block and the new block (case 206) as in the old/new block pair 134, no change has occurred and the block data has already been transferred in a previous snapshot. (d) Finally, where the data is not in the old block, but is in the new block (case 208) as in old/new block pair 136, then a changed data block is transferred over the network to become part of the changed volume snapshot set 140 at the destination as a changed block 142. In the exemplary write-anywhere arrangement, the changed blocks are written to new, unused locations in the storage array. Once all changed blocks are written, a base file system information block, that is the root pointer of the new snapshot, is then committed to the destination. The transmitted file system information block is committed, and updates the overall destination file system by pointing to the changed block structure in the destination, and replacing the previous file system information block. The changes are at this point committed as the latest incremental update of the destination volume snapshot. This file system accurately represents the "new" snapshot on the source. In time a new "new" snapshot is created from further incremental changes.

Approaches to volume-based remote mirroring of snapshots are described in detail in commonly owned U.S. patent application Ser. No. 09/127,497, now issued as U.S. Pat. No. 6,604,118 entitled FILE SYSTEM IMAGE TRANSFER by Steven Kleiman, et al. and U.S. patent application Ser. No. 09/426,409, now issued as U.S. Pat. No. 6,574,591 entitled FILE SYSTEM IMAGE TRANSFER BETWEEN DISSIMILAR FILE SYSTEMS by Steven Kleiman, et al., both of which patents are expressly incorporated herein by reference.

This volume-based approach to incremental mirroring from a source to a remote storage destination is effective, but may still be inefficient and time-consuming as it forces an entire volume to be scanned for changes and those changes to be transmitted on a block-by-block basis. In other words, the scan focuses on blocks without regard to any underlying information about the files, inodes and data structures, which the blocks comprise. The destination is organized as a set of volumes so a direct volume-by-volume mapping is established between source and destination. Again, where a volume may contain a terabyte or more of information, the block-by-block approach to scanning and comparing changes may still involve significant processor overhead and associated processing time. Often, there may have been only minor changes in a sub-block beneath the root inode block being scanned. Since a list of all blocks in the volume is being examined, however, the fact that many groupings of blocks (files, inode structures, etc.) are unchanged is not considered. In addition, the increasingly large size and scope of a full volume make it highly desirable to sub-divide the data being mirrored into sub-groups, because some groups are more likely to undergo frequent changes, it may be desirable to update their replicas more often than other, less-frequently changed groups. In addition, it may be desirable to mingle original and replicated (snapshotted) sub-groups in a single volume and migrate certain key data to remote locations without migrating an entire volume.

One such sub-organization of a volume is the well-known qtree. Qtrees, as implemented on an exemplary storage system such as described herein, are subtrees in a volume's file system. One key feature of qtrees is that, given a particular qtree, any file or directory in the system can be quickly tested for membership in that qtree, so they serve as a good way to organize the file system into discrete data sets. The use of qtrees as a source and destination for snapshotted data is desirable. Where a number of sub-organizations such as qtrees reside on a volume, it is common to store critical tree attributes/information in the qtree root directory inode of the tree structure in metadata, that is accessible to the file system. Such information may include security information and various system/qtree management information. This information can consume significant storage space. Because every inode needs to be set up with similar space, the required size of the root inode governs the size of all inodes. This translates into significant wasted storage space assigned to "ordinary" inodes so that the root's needs are satisfied. A more efficient location for storing sub-organization/qtree metadata information that allows the storage size of root inodes to be reduced is desirable. In addition a metadata location that allows for expansion space for future improvements is also desirable.

However, the use of qtrees, snapshot comparisons and volume implementation specific details on the source of a mirroring/replication data backup system requires that both the source and destination utilize the same or otherwise compatible file systems. In a modern heterogeneous network environment, the network may comprise of a variety of differing computer architectures including, for example, Windows 2000 computers, various versions of the Unix operating system, Linux or other operating systems. Each of these various operating systems may not support qtrees or other sub-volume characteristics.

It is desirous to provide an incremental backup/replication system and method that is operating system (OS) and file system (FS) independent. This OS and FS independence will enable the backup system to operate in modern heterogeneous networking environments. As these various operating systems may not support the file system sub-volume characteristics utilized by the storage system acting as a remote backup destination, conventional block-by-block or snapshot comparison techniques may not be utilized.

SUMMARY OF THE INVENTION

The disadvantages of the prior art are overcome by providing a system and method for on-the-fly file folding in a replicated storage system. The system and method transfers complete or whole files from a source to a destination. At the destination, a real-time file folding procedure is performed that only generates write operations for disk blocks that would be modified. This reduces substantially the processing and system overhead required in a replicated backup system and enables a destination server to interact with a variety of source systems, including those source systems that utilize file systems differing from that of the destination.

In accordance with the illustrative embodiment, the destination periodically polls the source system for modified files. In response to the polling, a replication agent, executing on the source system, checks for modified files and, if modified files are found, generates a data stream comprising of metadata and the data contained in the modified files to be sent to the destination system. This data stream is then transmitted over a network to the destination. At the destination, an on-the-fly file folding procedure is executed that forms a appropriately sized data blocks from the whole file data from the data stream and compares the data blocks to the blocks stored on disk. In the event that no change has occurred, i.e., the received data block and the block stored on disk are identical, then no write operation occurs. However, should the incoming data stream identify a modified block, the procedure writes the new data block to disk and unlinks the previously written or stored data block from the destination's disk. Thus, in the illustrative embodiment the destination only performs write operations when changed data is received.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Network and File Server Environment

Figure 1:
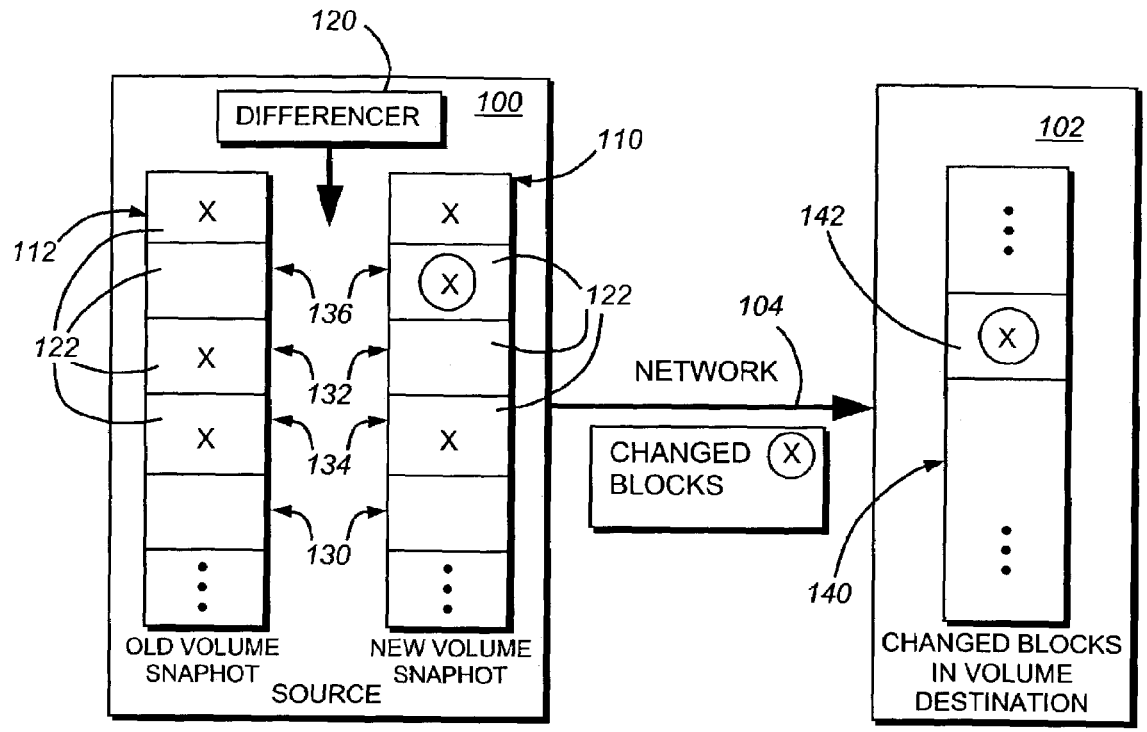
FIG. 1, already described, is a schematic block diagram of an exemplary remote mirroring of a volume snapshot from a source file server to a destination file server over a network according to a prior implementation.
Figure 2:
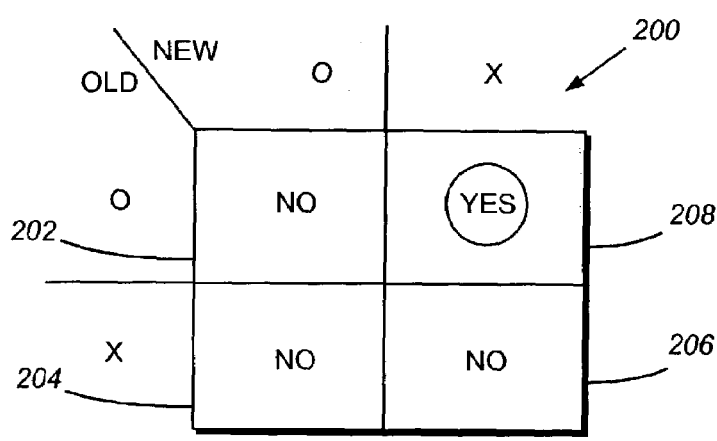
FIG. 2, already described, is a decision table used by a block differencer of FIG. 1 for determining whether a change in a block is to be transmitted from the source file server to the destination file server according to a prior implementation.
Figure 3:
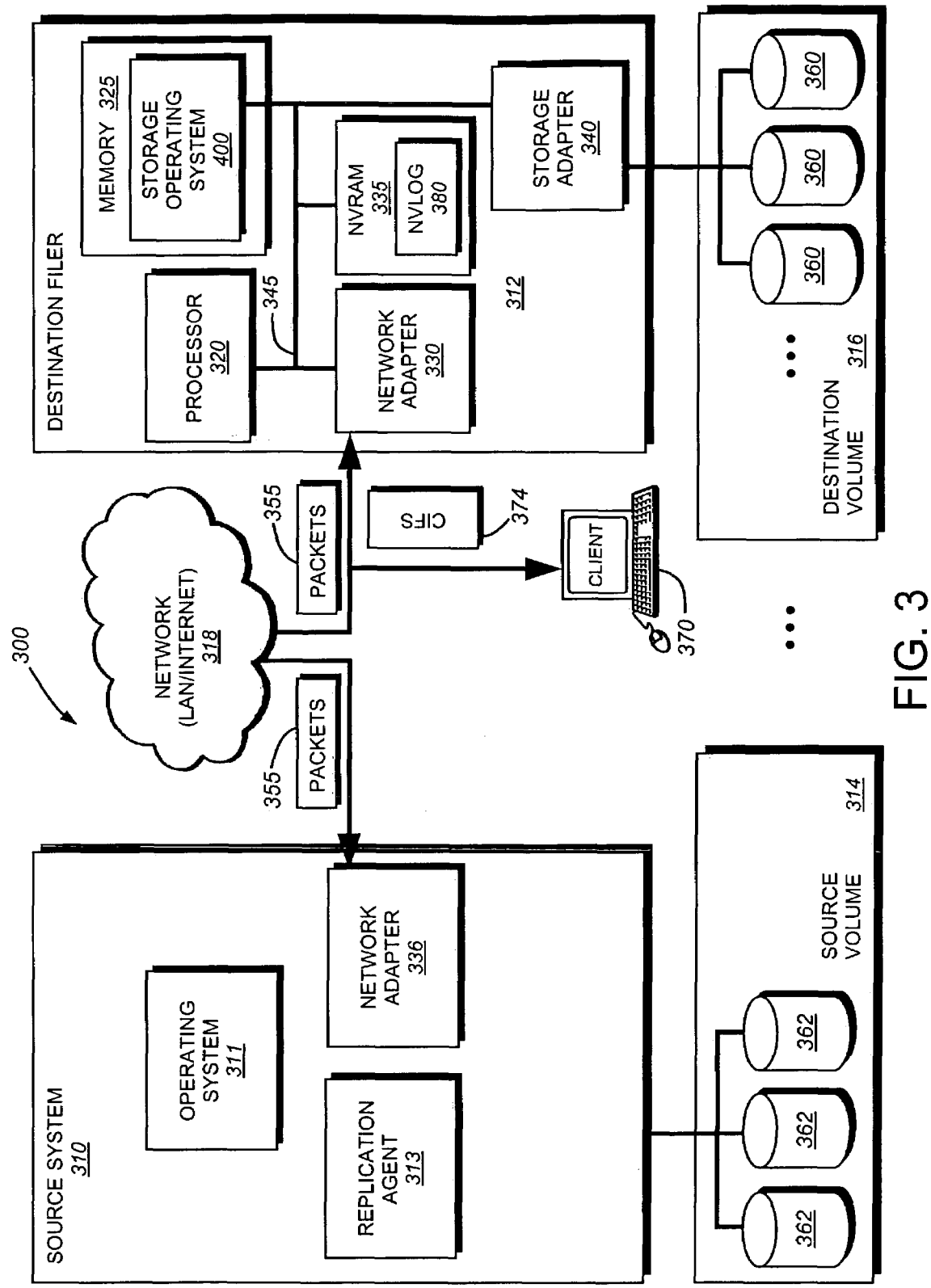
FIG. 3 is a schematic block diagram defining an exemplary network and file server environment including a source file server and a destination file server within which the principles of this invention are implemented.

By way of further background, FIG. 3 is a schematic block diagram of a storage system environment 300 that includes a pair of interconnected computers including a source system 310 and a destination file server 312 that may be advantageously used with the present invention. For the purposes of this description, the source system is a networked computer that manages storage one or more storage disks 362. The source system 310 executes an operating system 311. The operating system 311 may be, for example, the commercially available Sun Microsystem's Solaris®, Microsoft Windows® 2000, HP/UX or AIX. The operating system 311 implements an OS-specific file system on the disks 362 connected to the source system 310.

The destination filer 312 manages one or more destination volumes 316, comprising arrays of disks 360. The source and destination are linked via a network 318 that can comprise a local or wide area network, such as the well-known Internet. An appropriate network adapter 330 residing the source and destination 310, 312 facilitates communication over the network 318. As used herein, the term "source" can be broadly defined as a location from which the subject data of this invention travels and the term "destination" can be defined as the location to which the data travels. While a source system and a destination filer, connected by a network, is a particular example of a source and destination used herein, a source and destination could be computers/filers linked via a direct link, or via loopback (a "networking" arrangement internal to a single computer for transmitting a data stream between local source and local destination), in which case the source and the destination may comprise the same filer.

The destination filer 312 comprises a processor 320, a memory 325, a network adapter 330 and a storage adapter 340 interconnected by a system bus 345. Filer 312 also includes a storage operating system 400 (FIG. 4) that implements a file system to logically organize the information as a hierarchical structure of directories and files on the disks.

It will be understood to those skilled in the art that the inventive technique described herein may apply to any type of special-purpose computer (e.g., file serving appliance) or general-purpose computer, including a standalone computer, embodied as a storage system. To that end, the filer 312 can be broadly, and alternatively, referred to as a storage system. Moreover, the teachings of this invention can be adapted to a variety of storage system architectures including, but not limited to, a network-attached storage environment, a storage area network and disk assembly directly-attached to a client/host computer. The term "storage system" should, therefore, be taken broadly to include such arrangements.

In the illustrative embodiment, the memory 325 comprises storage locations that are addressable by the processor and adapters for storing software program code. The memory comprises a form of random access memory (RAM) that is generally cleared by a power cycle or other reboot operation (i.e., it is "volatile" memory). The processor and adapters may, in turn, comprise processing elements and/or logic circuitry configured to execute the software code and manipulate the data structures. The storage operating system 400, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 330 comprises the mechanical, electrical and signaling circuitry needed to connect the filer 312 to the network 318, which may comprise a point-to-point connection or a shared medium, such as a local area network. Moreover the source 310 may interact with the destination filer 312 in accordance with a client/server model of information delivery. That is, the client may request the services of the filer, and the filer may return the results of the services requested by the client, by exchanging packets 355 encapsulating, e.g., the TCP/IP protocol or another network protocol format over the network 318.

The storage adapter 340 cooperates with the operating system 400 (FIG. 4) executing on the filer to access information requested by the client. The information may be stored on the disks 360 that are attached, via the storage adapter 340 to the filer 312 or other node of a storage system as defined herein. The storage adapter 340 includes input/output (I/O) interface circuitry that couples to the disks over an I/O interconnect arrangement, such as a conventional high-performance, Fibre Channel serial link topology. The information is retrieved by the storage adapter and processed by the processor 320 as part of the snapshot procedure, to be described below, prior to being forwarded over the system bus 345 to the network adapter 330, where the information is formatted into a packet and transmitted to the destination server as also described in detail below.

The filer may also be interconnected with one or more clients 370 via the network adapter 330. The clients transmit requests for file service to the filer 312 respectively, and receive responses to the requests over a LAN or other network (318). Data is transferred between the client and the filer 312 using data packets 374 defined as an encapsulation of the Common Internet File System (CIFS) protocol or another appropriate protocol, such as NFS.

In one exemplary filer implementation, the filer 312 can include a non-volatile random access memory (NVRAM) 335 that provides fault-tolerant backup of data, enabling the integrity of filer transactions to survive a service interruption based upon a power failure, or other fault. The size of the NVRAM depends in part upon its implementation and function in the file server. It is typically sized sufficiently to log a certain time-based chunk of transactions (for example, several seconds worth). The NVRAM is filled, in parallel with the buffer cache, after each client request is completed, but before the result of the request is returned to the requesting client.

In an illustrative embodiment, the disks 360 are arranged into a plurality of volumes (for example, source volumes 314 and destination volumes 316), in which each volume has a file system associated therewith. The volumes each include one or more disks 360. In one embodiment, the physical disks 360 are configured into RAID groups so that some disks store striped data and some disks store separate parity for the data, in accordance with a preferred RAID 4 configuration. However, other configurations (e.g. RAID 5 having distributed parity across stripes) are also contemplated. In this embodiment, a minimum of one parity disk and one data disk is employed. However, a typical implementation may include three data and one parity disk per RAID group, and a multiplicity of RAID groups per volume.

B. Storage Operating System

To facilitate generalized access to the disks 360, the storage operating system 400 (FIG. 4) implements a write-anywhere file system that logically organizes the information as a hierarchical structure of directories and files on the disks. Each "on-disk" file may be implemented as a set of disk blocks configured to store information, such as data, whereas the directory may be implemented as a specially formatted file in which references to other files and directories are stored. As noted and defined above, in the illustrative embodiment described herein, the storage operating system is the NetApp® Data ONTAP™ operating system available from Network Appliance, Inc., of Sunnyvale, Calif. that implements the Write Anywhere File Layout (WAFL™) file system. It is expressly contemplated that any appropriate file system can be used, and as such, where the term "WAFL" is employed, it should be taken broadly to refer to any file system that is otherwise adaptable to the teachings of this invention.

Figure 4:
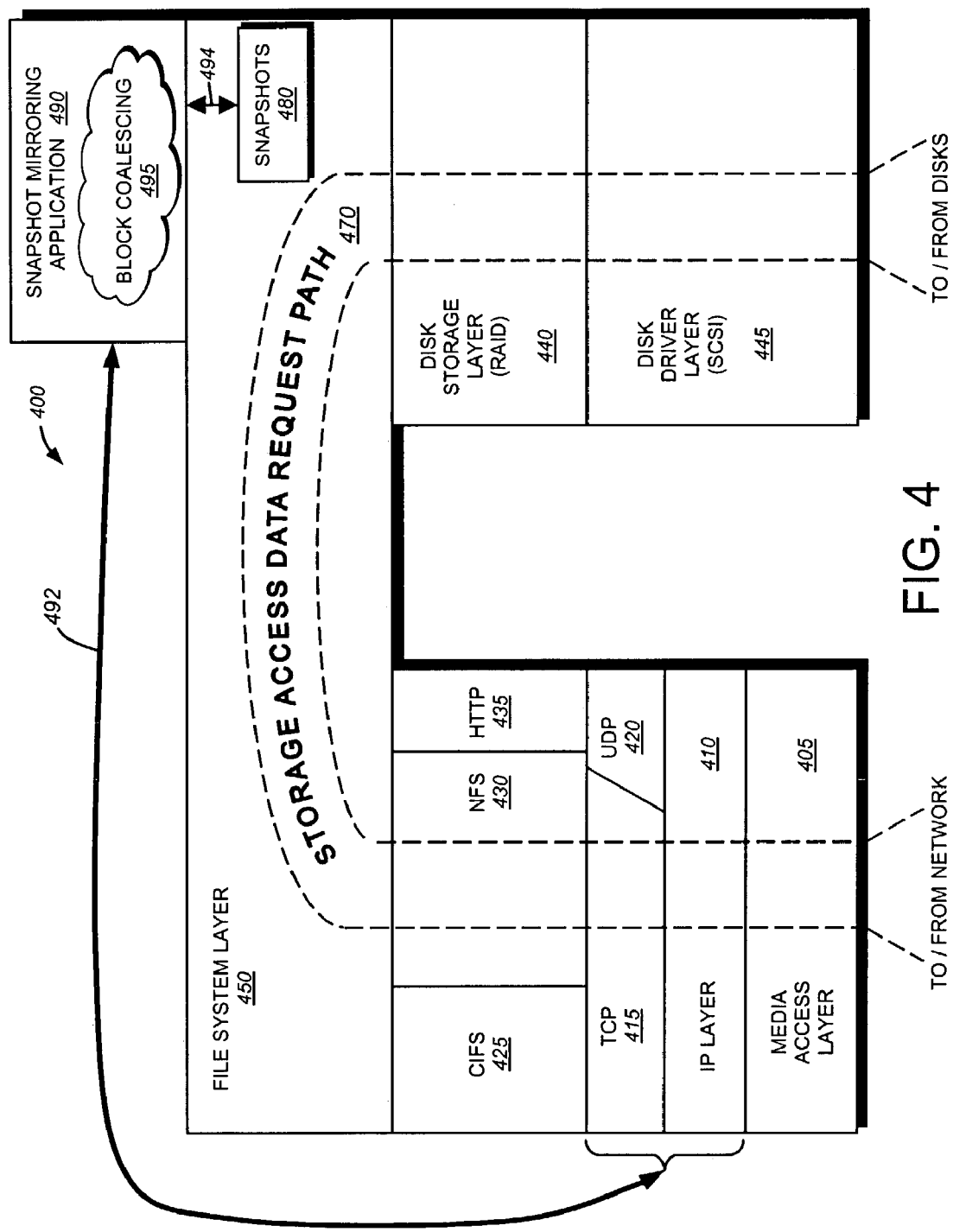
FIG. 4 is a schematic block diagram of an exemplary storage operating system for use with the file servers of FIG. 3.

The organization of the preferred storage operating system for each of the exemplary filers is now described briefly. However, it is expressly contemplated that the principles of this invention can be implemented using a variety of alternate storage operating system architectures. As shown in FIG. 4, the exemplary storage operating system 400 comprises a series of software layers, including a media access layer 405 of network drivers (e.g., an Ethernet driver). The operating system further includes network protocol layers, such as the Internet Protocol (IP) layer 410 and its supporting transport mechanisms, the Transport Control Protocol (TCP) layer 415 and the User Datagram Protocol (UDP) layer 420. A file system protocol layer provides multi-protocol data access and, to that end, includes support for the CIFS protocol 425, the NFS protocol 430 and the Hypertext Transfer Protocol (HTTP) protocol 435. In addition, the storage operating system 400 includes a disk storage layer 440 that implements a disk storage protocol, such as a RAID protocol, and a disk driver layer 445, that implements a disk control protocol such as the small computer system interface (SCSI).

Bridging the disk software layers with the network and file system protocol layers is a file system layer 450 of the storage operating system 400. Generally, the layer 450 implements a file system having an on-disk format representation that is block-based using, e.g., 4-kilobyte (KB) data blocks and using inodes to describe the files. In response to transaction requests, the file system generates operations to load (retrieve) the requested data from volumes if it is not resident "in-core", i.e., in the filer's memory 325. If the information is not in memory, the file system layer 450 indexes into the inode file using the inode number to access an appropriate entry and retrieve a volume block number. The file system layer 450 then passes the volume block number to the disk storage (RAID) layer 440, which maps that volume block number to a disk block number and sends the latter to an appropriate driver (for example, an encapsulation of SCSI implemented on a fibre channel disk interconnection) of the disk driver layer 445. The disk driver accesses the disk block number from volumes and loads the requested data in memory 325 for processing by the filer 312. Upon completion of the request, the filer (and storage operating system) returns a reply, e.g., a conventional acknowledgement packet 374 defined by the CIFS specification, to the client 370 over the respective network connection 372.

It should be noted that the software "path" 470 through the storage operating system layers described above needed to perform data storage access for the client request received at the filer may alternatively be implemented in hardware or a combination of hardware and software. That is, in an alternate embodiment of the invention, the storage access request data path 470 may be implemented as logic circuitry embodied within a field programmable gate array (FPGA) or an application specific integrated circuit (ASIC). This type of hardware implementation increases the performance of the file service provided by the filer 312 in response to a file system request packet 374 issued by the client 370.

Overlying the file system layer 450 is the snapshot mirroring (or replication) application 490. This application is responsible for the generation of the updated mirror snapshot from received information from the source. The snapshot mirroring application 490 operates outside of the storage access request path 470, as shown by the direct links 492 and 494 to the TCP/IP layers 415, 410 and the file system snapshot mechanism (480).

In accordance with an embodiment of the present invention, within the snapshot mirroring application 490 is a block coalescing process 495 that implements the novel block coalescing function, described further below.

C. Remote Mirroring of Non-File Server Based File Systems

1. Source Processing

In accordance with an illustrative embodiment, the source system must identify and transfer modified files to the destination filer for backup/replication purposes. In the illustrative embodiment, this procedure is performed by a replication agent 313 executing on the source system. As noted above, the replication agent may be implemented in a variety of forms including, for example, a daemon, a background process, or as a user-executed backup command.

Figure 5:
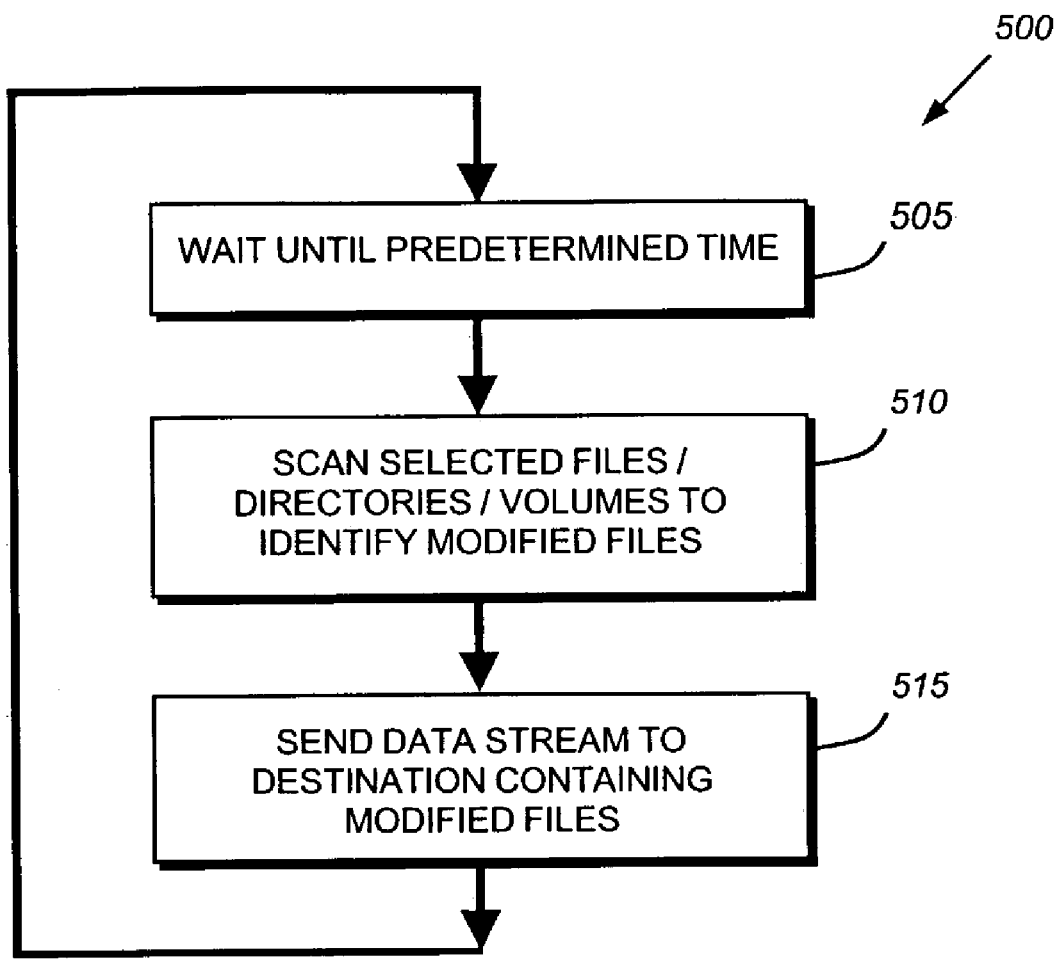
FIG. 5 is a flow chart detailing the steps of a procedure performed on the source side in sending modified file information to the destination in accordance with an embodiment of the present invention.

FIG. 5 is a flow chart of the steps of a procedure 500 performed by the illustrative replication agent in an exemplary embodiment of the present invention. The replication agent first waits until a predetermined time in step 505. Thus, the replication agent may be configured so that it performs a backup, e.g., every hour, once a night or some other user-defined time period. Once the predetermined time has occurred, the procedure then, in step 510, scans the selected files, directories and/or volumes to identify modified files. The replication agent may, in the illustrative embodiment, be configured so that it will back up/replicate only certain files or certain directories or entire volumes or other sub-volume units associated with the source system. In alternate embodiments, a user or administrator may select, using a command line interface (CLI) or graphical user interface (GUI), a subset of the files, directories, qtrees and/or volumes accessible to the source system. This subset will be replicated using the teachings of the present invention. The replication agent identifies modified files by checking a last modified or last changed parameter associated with the file. This may be accomplished using conventional file system techniques. Once the replication agent has identified those files that have been modified since the last backup or replication time period, the procedure then, in step 515, creates and sends a data stream to the destination that contains the modified files. Once this data stream has been successfully sent, the procedure loops back to step 505 and waits for the next predetermined time period.

2. Communication Between Source and Destination

The format of the data stream between the source and destination is described further below. In general, its use is predicated upon having a structure that supports multiple protocol attributes (e.g. Unix permissions, NT access control lists (ACLs), multiple file names, NT streams, file type, file-create/modify time, etc.). The format should also identity the data in the stream (i.e. the offset location in a file of specific data or whether files have "holes" in the file offset that should remain free). The names of files should also be relayed by the format. More generally, the format should also be independent of the underlying network protocol or device (in the case of a tape or local disk/non-volatile storage) protocol and file system—that is, the information is system "agnostic," and not bound to a particular operating system software, thereby allowing source and destination systems of different vendors to share the information. The format should, thus, be completely self-describing requiring no information outside the data stream. In this manner a source file directory of a first type can be readily translated into destination file directory of a different type. It should also allow extensibility, in that newer improvements to the source or destination operating system should not affect the compatibility of older versions. In particular, a data set (e.g. a new header) that is not recognized by the operating system should be ignored or dealt with in a predictable manner without triggering a system crash or other unwanted system failure (i.e. the stream is backwards compatible). This format should also enable transmission of a description of the whole file system, or a description of only changed blocks/information within any file or directory. In addition, the format should generally minimize network and processor overhead required for transferring modified file data.

Figure 6:
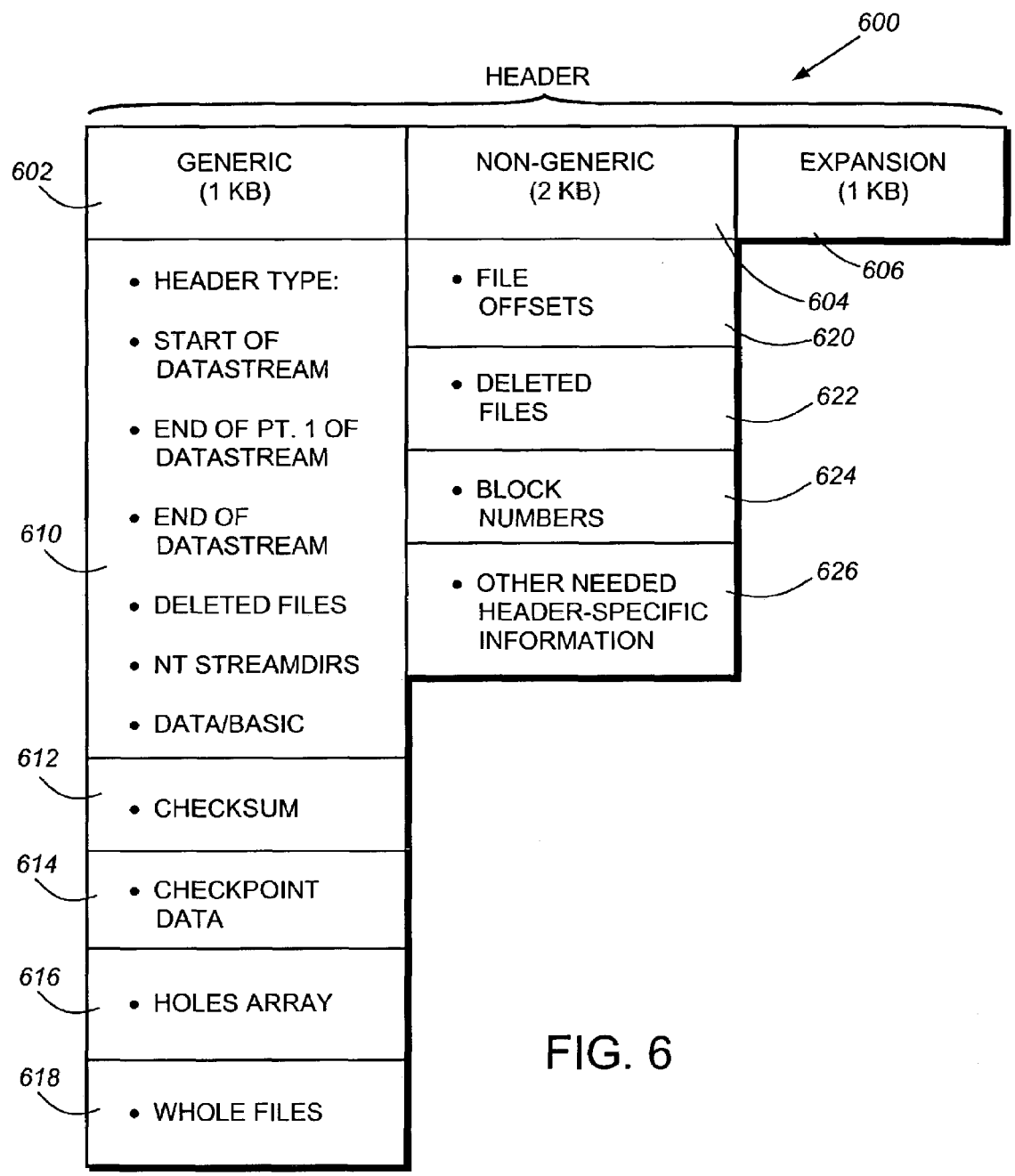
FIG. 6 is a schematic block diagram of a standalone header structure for use in the data stream transmission format between the source and the destination according to an illustrative embodiment of the present invention.
Figure 7:
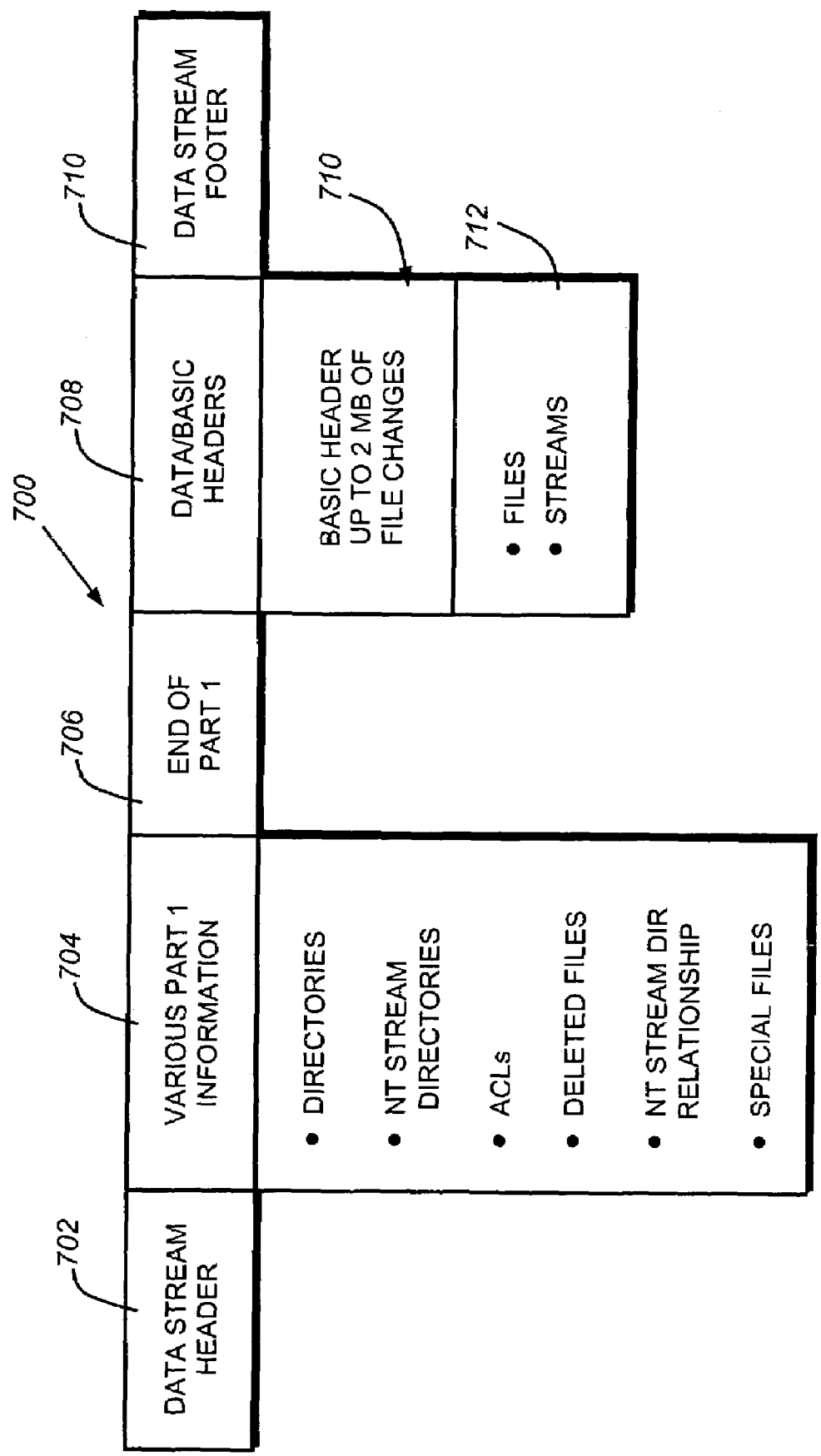
FIG. 7 is a schematic block diagram of a data stream transmission format between a source and a destination according to an illustrative embodiment of the present invention.

The format into which source file changes are organized is shown schematically in FIGS. 6 and 7. In the illustrative embodiment, the format is organized around 4 kilobyte (KB) blocks. The header size and arrangement can be widely varied in alternate embodiments, however. There are 4 KB headers (600 in FIG. 6) that are identified by certain "header types." Basic data stream headers ("data") are provided for at most every 2 megabytes (MB) of changed data. With reference to FIG. 6, the 4 KB standalone header includes three parts, a 1 KB generic part 602, a 2 KB non-generic part 604, and an 1 KB expansion part 600. The expansion part is not used, but is available for later versions.

The generic part 602 contains an identifier of header type 610. Standalone header types (i.e. headers not followed by associated data) can indicate a start of the data stream; an end of part one of the data stream; an end of the data stream; a list of deleted files encapsulated in the header; or the relationship of any NT streamdirs. Later versions of Windows NT allow for multiple NT "streams" related to particular filenames. A discussion of streams is found in U.S. patent application Ser. No. 09/891,195, now issued as U.S. Pat. No. 6,446,653 entitled SYSTEM AND METHOD FOR REPRESENTING NAMED DATA STREAMS WITHIN AN ON-DISK STRUCTURE OF A FILE SYSTEM, by Kayuri Patel, et al, the teachings of which are expressly incorporated herein by reference. Also in the generic part 602 is a checksum 612 that ensures the header has not been corrupted during the data transfer. In addition other data such as a "checkpoint" 614 used by the source and destination to track the progress of replication is provided. By providing a list of header types, the destination can more easily operate in a backwards-compatible mode—that is, a header type that is not recognized by the destination (provided from a newer version of the source) can be more easily ignored, while recognized headers within the limits of the destination version are processed as usual.

In addition, the generic part 602 includes a flag identifying whether the data to follow are whole files 618 or not. The whole files flag 618 is, in the illustrative embodiment, set to a value of TRUE when the data being sent in the data stream comprises whole files instead of only changed blocks. The whole files flag 618 alerts the destination that it should utilize the teachings of the present invention in file folding the modified files instead of performing the conventional incremental block update procedure.

The kind of data in the non-generic part 604 of the header 600 depends on the header type. It could include information relating to file offsets (620) in the case of the basic header, used for follow-on data transmission, deleted files (in a standalone header listing of such files that are no longer in use on the source or whose generation number has changed) (622), or other header-specific information (624 to be described below). Again, the various standalone headers are interposed within the data stream format at an appropriate location. Each header is arranged to either reference an included data set (such as deleted files) or follow-on information (such as file data).

FIG. 7 describes the format of the illustrative replication data stream in further detail. The format of the replicated data stream is headed by a standalone data stream header 702 of the type "start of data stream." This header contains data in the non-generic part 604 generated by the source describing the attributes of the data stream.

Next a series of headers and follow-on data in the format define various "part 1" information (704). Significantly, each directory data set being transmitted is preceded by a basic header with no non-generic data. Only directories that have been modified are transmitted, and they need not arrive in a particular order. Note also that the data from any particular directory need not be contiguous. Each directory entry is loaded into a 4 KB block. Any overflow is loaded into a new 4 KB block. Each directory entry is a header followed by one or more names. The entry describes an inode and the directory names to follow. NT stream directories are also transmitted.

The part 1 format information 704 also provides ACL information for every file that has an associated ACL. By transmitting the ACLs before their associated file data, the destination can set ACLs before file data is written. ACLs are transmitted in a "regular" file format. Deleted file information (described above) is sent with such information included in the non-generic part 604 of one or more standalone headers (if any). By sending this information in advance, the directory tree builder can differentiate between moves and deletes.

The part 1 format information 704 may also carry, in alternate embodiments, NT stream directory (streamdir) relationship information. One or more standalone-headers (if any) notifies the destination file server of every changed file or directory that implicates NT streams, regardless of whether the streams have changed. This information is included in the non-generic part 604 of the header 600 (FIG. 6).

Finally, the part 1 format information 704 includes special files for every change in a symlink, named pipe, socket, block device, or character device in the replicated data stream. These files are sent first, because they are needed to assist the destination in building the infrastructure for creation of the replicated file system before it is populated with file data. Special files are, like ACLs, transmitted in the format of regular files.

Once various part 1 information 704 is transmitted, the format calls for an "end of part 1 of the data stream" header 706. This is a basic header having no data in the non-generic part 604. This header tells the destination that part 1 is complete and to now expect file data.

After the part 1 information, the format presents the file and stream data 708. A basic header 710 for every 2 MB or less of changed data in a file is provided, followed by the file data 712 itself. The files comprising the data need not be written in a particular order, nor must the data be contiguous. In addition, referring to the header in FIG. 6, the basic header includes a block numbers data structure 630, associated with the non-generic part 604 works in conjunction with the "holes array" 632 within (in this example) the generic part 602. The holes array denotes empty space. This structure, in essence, provides the mapping from the holes array to corresponding blocks in the file. This structure instructs the destination where to write data blocks or holes.

In general files (712) are written in 4 KB chunks with basic headers at every 512 chunks (2 MB), at most. Likewise, streams (also 712) are transmitted like regular files in 4 KB chunks with at most 2 MB between headers.

Finally, the end of the replicated data stream format 700 is marked by a footer 720 consisting of standalone header of the type "end of data stream." This header has no specific data in its non-generic part 604 (FIG. 6).

3. Destination

When the remote destination receives the formatted data stream from the source via the network, it creates a new file or modifies an existing mirrored file (or another appropriate organizational structure) and fills it with changed data.

Figure 8:
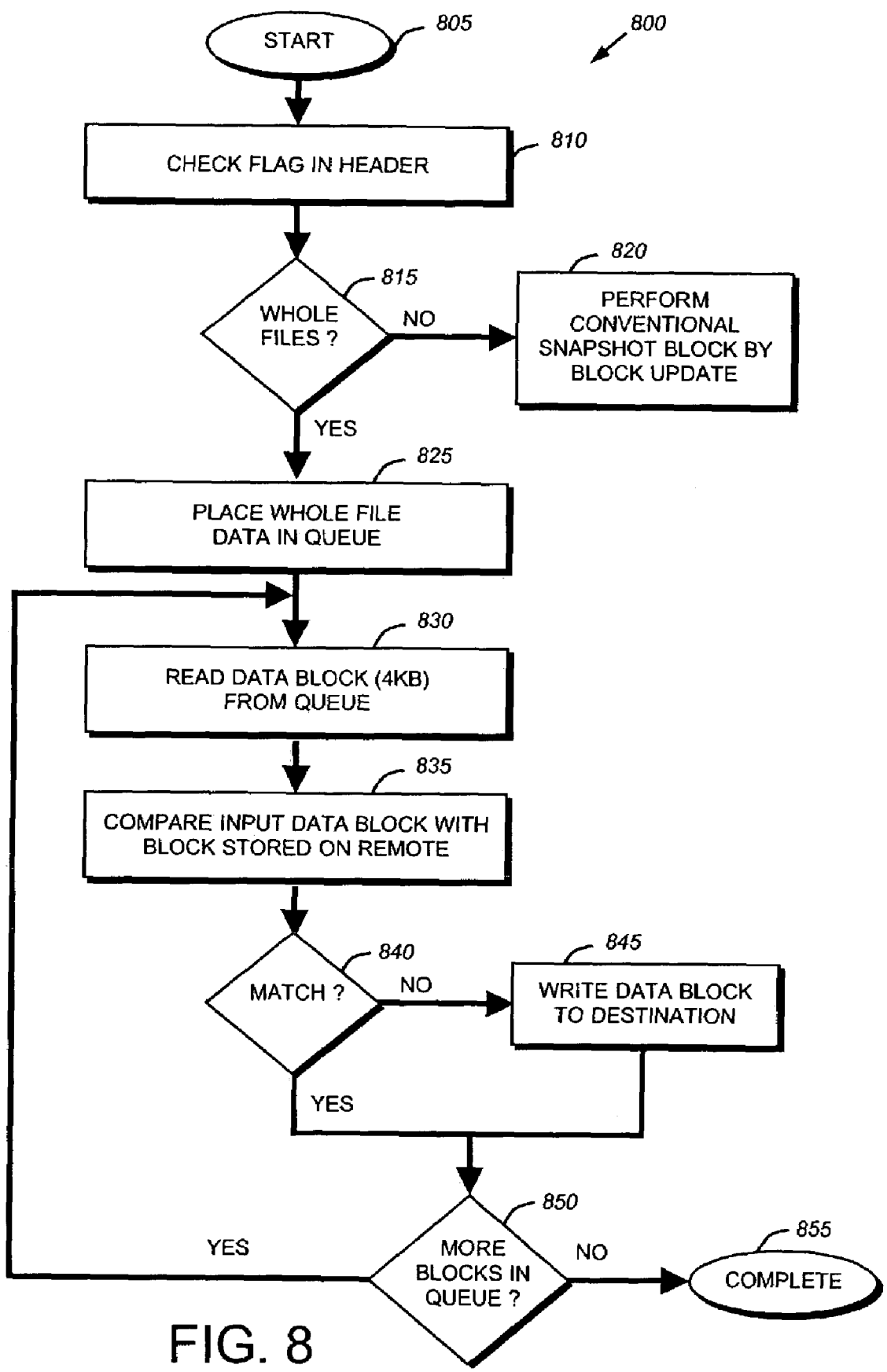
FIG. 8 is a flow chart detailing the steps of an procedure performed by the destination in performing on-the-fly file folding in accordance with an embodiment of the pre-sent invention.

In accordance with the illustrative embodiment, the destination performs a file folding technique to reduce the amount of disk space occupied and to reduce the number of write operations that must occur. This increases both the amount of usable disk space and improves system performance by reducing the need for unnecessary write operations. This file folding procedure 800 is shown in a flow chart in FIG. 8. The procedure begins in step 805 and proceeds to step 810 where the procedure checks the whole files flag in the header of the beginning of a transmission. The procedure then, in decision block 815, decides if the whole files flag is set. If it is not set, the procedure branches to step 820 where it performs the conventional snapshot block-by-block update as described in the above-incorporated patent application. However, if the whole files flag is set, the procedure continues to step 825 where the whole file data is placed in a queue for later processing.

The destination continuously reads data blocks from the queue in step 830. In the illustrative embodiment, these data blocks will be four kilobyte (KB) blocks that correspond to the blocks of the file system associated with the destination file server. In alternate embodiments, these data blocks may be of varying sizes to correspond to the appropriate sized blocks of the destination file server. The procedure then, in step 835, compares the received input data block with its corresponding block stored on the remote destination file server. In decision block 840 a determination is made whether the data matches from that received from the source and the data stored on the destination. If the data does not match, the procedure then branches to step 845, where the data block that was received is written to the destination and the data block that was previously stored in the destination is released. Thus, the new file will no longer contain pointers to the previously stored data block but will include pointers to the newly written data block that contains changed information. After the data block has been written to the destination, the procedure continues to step 850. Similarly, should the blocks match in step 840, which indicates that no changes occurred to that data block, the procedure will also proceed to step 850 with no write operation occurring. In step 850 a determination is made if there are more blocks to be read in the queue. If no more blocks are to be read in the queue, the transfer is complete (855) and appropriate clean up operations occur. However, if additional blocks are to be read, the procedure loops back to step 830 and reads an additional data block from the queue.

Figure 9:
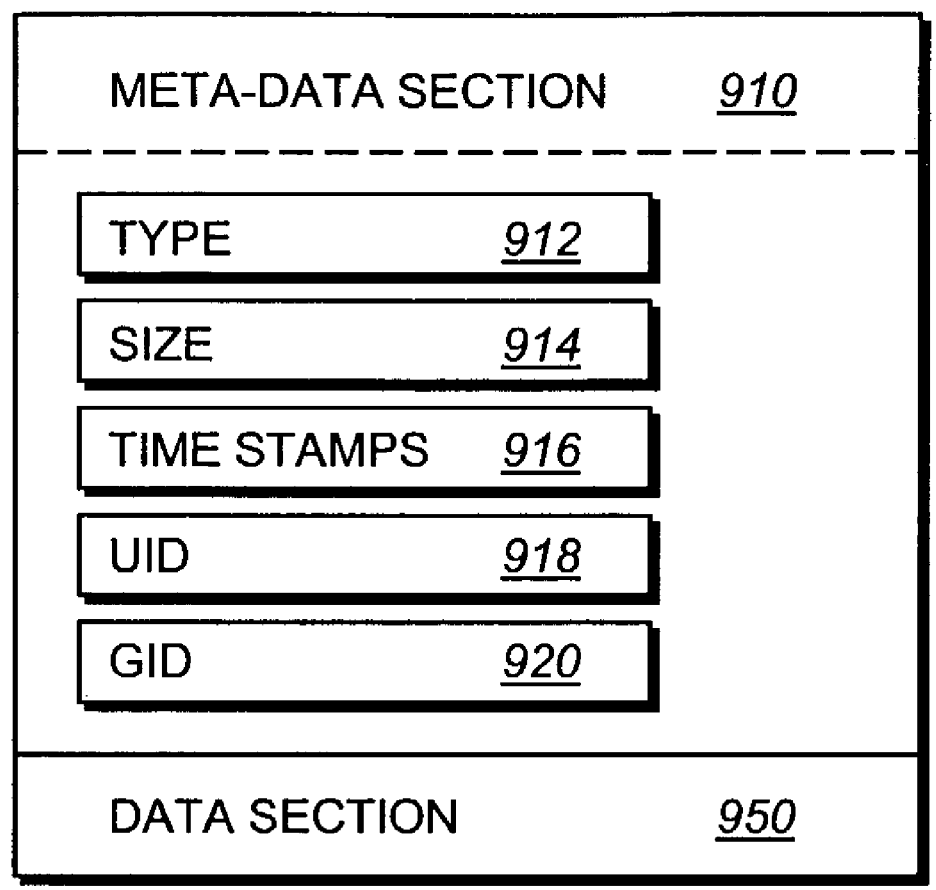
FIG. 9 is a schematic block diagram of an exemplary inode data structure in accordance with an embodiment of the present invention.

In the illustrative embodiment, a file is represented in the exemplary destination file system as an inode data structure adapted for storage on disks. FIG. 9 is a schematic block diagram illustrating an inode 900, which preferably includes a metadata section 910 and a data section 950. The information stored in the metadata section 910 of each inode 900 describes the file and, as such, includes the type (e.g., regular or directory) 910 of file, the size 914 of the file, time stamps (e.g., creation, access and/or modification) 916 for the file and ownership, i.e., user identifier (UID 918) and group ID (GID 920), of the file. The contents of the data section 950 of each inode, however, may be interpreted differently depending upon the type of file (inode) defined within the type field 912. For ex-ample, the data section 950 of a directory inode contains metadata controlled by the file system, whereas the data section of a regular inode contains user-defined data. In this latter case, the data section 950 includes a representation of the data associated with the file.

Specifically, the data section 950 of a regular on-disk inode may include user data or pointers, the latter referencing 4 KB data blocks on disk used to store the user data. Each pointer is preferably a logical VBN to thereby facilitate efficiency among the file system and the disk storage (RAID) layer when accessing the data on disks. Given the restricted size (e.g., 128 bytes) of the inode, user data having a size that is less than or equal to 64 bytes is represented, in its entirety, within the data section of that inode. However, if the user data is greater than 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 950 of the inode (e.g., a level 2 inode) references an indirect block (e.g., a level 1 block) that contains 1024 pointers, each of which references a 4 KB data block (e.g., a level 0 block) on disk. For user data having a size greater than 64 MB, each pointer in the data section 950 of the inode (e.g., a third level inode) references a double-indirect block (e.g., a level 2 block) that contains 1024 pointers, each referencing an indirect, level 1 block. The indirect block, in turn, contains 1024 pointers, each of which references a 4 KB direct level 0 data block on disk. Each data block is loaded from disk into the buffer cache in order to access the data.

Figure 10:
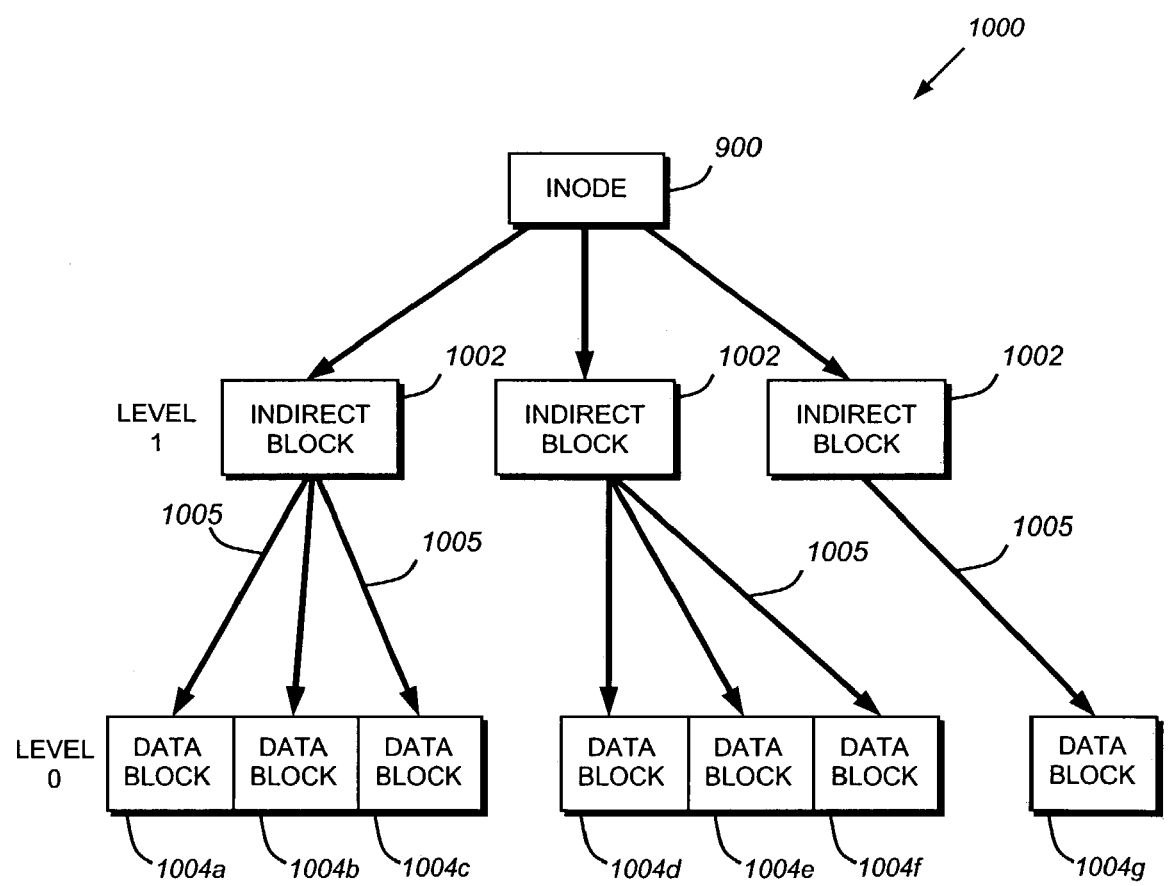
FIG. 10 is a schematic diagram of an exemplary inode tree representing a file in accordance with an embodiment of the present invention.

FIG. 10 is a schematic block diagram illustrating the organization of blocks as an inode buffer tree 1000 in the file system. An inode 900, such as an embedded inode, references indirect, level 1 blocks 1002. As noted, these indirect blocks contain pointers 1005 (e.g., VBNs) that reference level 0 data blocks 1004 used to store the actual data of a file. That is, the data of a file are contained in data blocks and the locations of these blocks are stored in the indirect blocks of the file. Each indirect block 1002 may contain pointers to as many as 1024 data blocks. According to the "write anywhere" nature of the illustrative file system, these blocks may be located anywhere on the disks of the file system.

Thus, in operation, the present invention may have a stored copy of a file, represented by file 1000, stored at the destination. When the incoming data stream is received by the destination, the system and method will progress through the various data blocks 1004 *a-g* and compare the stored data blocks to the data blocks received from the input data stream. For example, the first received data block would be compared against data block 1004*a*, the second against data block 1004*b*, etc.

To again summarize, the system and method of the present invention enables on-the-fly file folding to reduce the number of write operations in a file system. In the illustrative embodiment, the on-the-fly file folding is implemented at a destination of a replicated storage system. A replication agent, executing on the source system, identifies, in response to polling from the destination, modified files and transmits the modified files in a data stream to the destination. On the destination side, the input data stream is parsed and individual data blocks are taken from the modified files that are being transmitted. These received data blocks are then compared against its corresponding data block stored on the destination. If the received data block and the destination data block are identical then no write operation occurs. However, should the received data block differ from the stored data block, then the received data block is written to disk and the appropriate pointers in indirect blocks and inodes are updated to point to the newly written data block. In the illustrative embodiment, the file system utilizes a WAFL file system cover which eliminates the need to overwrite the previously written block as the newly written data block may be written any place on the disk's surface that is free.

The foregoing has been a detail description of illustrative embodiments of the invention. Various modifications and additions can be made without departing form the spirit and scope of the invention. For example, the number of interconnected source and/or destination computers depicted can be varied. In fact, the source and destination servers can be the same machine. It is expressly contemplated that a plurality of sources can transfer data to a destination and vice versa. Likewise, the internal architecture of the servers or their respective storage arrays, as well as their network connectivity and protocols, are all highly variable. The operating systems used on various source and destination servers can differ. More generally, the teachings of the present invention may be utilized with reference to any data container embodied in a storage system having an active store and one or more reference stores. The term data container generally refers to a unit of storage for holding data, such as a file, a volume or a logical unit number (LUN), which is addressable by, e.g., its own unique identification. Thus, while the illustrative embodiment is written with reference to files contained within a file system, the teachings of the present invention may be implemented using any data container, including, for example, a volume. In addition, it is expressly contemplated that any of the operations and procedures described herein can be implemented using hardware, software comprising a computer-readable medium having program instructions executing on a computer, or a combination of hardware and software.

What is claimed is:

1. A replicated storage system comprising:
   a source system having a replication agent adapted to generate an input data stream including whole file data corresponding to modified files on the source system; and
   a destination system operatively interconnected with the source system and adapted to receive the input data stream, the destination system further adapted to form the whole file data into data blocks that are compatible with the destination system and write formed data blocks to the destination system if the formed data block does not match a corresponding data block on the destination system.

2. The replicated storage system of claim 1, wherein the destination system and source system use incompatible file systems.

3. The replicated storage system of claim 1, wherein the replication agent is adapted to identify, at a predetermined time interval, modified files associated with the source system.

4. The replicated storage system of claim of claim 1 wherein the input data stream comprises one or more headers and data associated with the modified files.

5. The replicated storage system of claim 1 wherein the destination system comprises a file server.

6. A replicated storage system comprising:
   a source system having means for generating an input data stream including whole file data representing files modified on the source system; and
   a destination system operatively interconnected with the source system and having means for receiving the input data stream and forming data blocks from the input data stream, the data blocks being compatible with storage on the destination system.

7. The replicated storage system of claim 6 wherein the files modified on the source system were generated with a file system that is incompatible with storage on the destination system.

8. A system for incrementally changing a data container stored on a source system and replicated on a destination system, the system comprising:
   a replication agent on the source system for checking if a data container on the source system has been modified;
   a network interface on the source system for transmitting a data stream to the destination system, the data stream including the entire data container that has been modified; and
   a process, at the destination system, adapted to,
      a) form one or more first data blocks from the data stream, the one or more first data blocks being compatible with the destination system,
      b) compare the one or more first data blocks to one or more second data blocks stored on the destination system to determine which first data blocks and second data blocks are not identical, and
      c) write the non identical first data blocks to the destination system.

9. The system of claim 8, wherein the data containers are generated on the source system by a file system that is incompatible with the destination system.

10. The system of claim 9, wherein each data container is a volume.

11. The system of claim 8, wherein the data container comprises attributes assigned by the source system, and the process is executed in response to a particular attribute of a data container.

12. A system for incrementally changing a data container stored on a source system and replicated on a destination system, the system comprising:
   means for checking, by a replication agent on the source system, for one or more modified files stored at the source system using a first file system;
   means for creating, in response to detecting one or more modified files, a data stream comprising whole file data including the modified files and metadata comprising information related to the whole file data;

means for transmitting the data stream over a network to the destination system;

means for forming one or more data blocks compatible with storage on the destination system from the data stream;

means for comparing the formed data blocks to corresponding data blocks stored on the destination system, and means for writing the formed data blocks to the storage in the destination system if the comparing step indicates that a formed data block and its corresponding stored data block are not identical.

13. A method for changing a file stored on a source and replicated on a destination system, the method comprising the steps of:

writing whole file data from the source to a queue on the destination system;

reading, from the queue, data blocks that correspond to blocks of the destination system;

comparing the data blocks read from the queue with corresponding data blocks stored on the destination system; and in response to a particular data block read from the queue not matching a corresponding data block on the destination file system, writing the particular data block to the destination system as data blocks compatible with the destination system.

14. The method of claim 13 wherein each of the data blocks read from the queue comprises four kilobytes of data.

15. The method claim 13 wherein the whole file data comprises files identified as modified on the source and metadata corresponding to the modified files.

16. The method of claim 15 wherein the source system comprises a replication agent adapted to identify modified files on the source system and generate the whole file data.

17. The method of claim 16 further comprises the steps of:
polling the replication agent by the destination system; and
identifying modified files on the source system, by the replication agent, in response to the polling.

18. The method of claim 13 wherein the whole file data is transmitted from the source to the destination system in a data stream, wherein the input data stream includes a flag identifying that the data stream includes whole file data.

19. The method of claim 13 wherein the step of writing the particular data block to the destination system further comprises the steps of:
writing the particular data block to a storage device containing the file; and
removing the corresponding block from the storage device.

20. The method of claim 19 wherein the storage device comprises at least one disk.

21. The method of claim 19 wherein the step of removing the corresponding block further comprises the step of modifying one or more pointers in an inode.

22. The method of claim 13 wherein the whole file data is generated on the source using a first file system; wherein the destination system uses a second file system, and wherein the data blocks read from the queue are compatible with the second file system.

23. The method of claim 22 wherein the first file system is incompatible with the second file system.

24. A method for incrementally changing a file stored on a source system and replicated on a destination system, the method comprising the steps of:

checking, by a replication agent on the source system, for one or more modified files stored at the source system using a first file system;

creating, in response to detecting one or more modified files, a data stream comprising whole file data including the modified files and metadata comprising information related to the whole file data;

transmitting the data stream over a network to the destination system;

forming one or more data blocks compatible with storage on the destination system from the data stream;

comparing the formed data blocks to corresponding data blocks stored on the destination system, and if the comparing step indicates that a formed data block and its corresponding stored data block are not identical, then writing the formed data blocks to the storage in the destination system.

25. The method of claim 24, wherein the first file system is incompatible with storage on the destination system.

26. The method of claim 24, wherein the replication agent performs the checking step periodically.

27. The method of claim 24, wherein the destination system periodically requests that the source system perform the checking step.

28. The method of claim 24, wherein all the data of the modified files are included in the data stream.

29. The method of claim 24 further comprising the step of, if the comparing step indicates that a formed data block and its corresponding stored data block are identical then discarding the formed data block.

30. The method of claim 24, wherein the comparing step comprises a block by block comparison of the formed data blocks and corresponding data blocks on the destination system.

31. The method of claim 24 further including the steps of maintaining, at the source system, a file system including the files checked for modification, and maintaining, at the destination system, a logical representation of the file system.

32. The method of claim 31, wherein the maintaining step comprises maintaining, at the destination system, a snapshot of the file system.

33. The method of claim 24, wherein the file data includes data contained within a file and attributes of the file.

34. The method of claim 33, wherein the attributes of the file include file creation time, permissions and access control information stored in associated with a file in the source system.

35. A method for incrementally changing a data container stored on a source system and replicated on a destination system, the method comprising the steps of:

checking, by a replication agent on the source system, for one or more modified data containers and attributes associated therewith in the source system;

creating, in response to detecting one or more modified data containers, a data stream comprising data included in the modified data containers and their attributes;

transmitting the data stream over a network to the destination system;

forming one or more data blocks compatible with storage on the destination system from the data stream;

comparing the formed data blocks to corresponding data blocks stored on the destination system, and if the comparing step indicates that a formed data block and its corresponding stored data block are not identical, then writing the formed data blocks to the storage in the destination system.

36. The method of claim 35, wherein each data container comprises a volume.

37. A method for backing up a file system maintained by a computer system, the method comprising the steps of:

detecting a file in the file system that has been changed, that file referred to as a changed file;

converting the changed file into a data stream, the data stream is directed to a backup computer system;

receiving the data stream by the backup computer system;

converting the data stream into blocks of a fixed size, the fixed block size independent of the file system;

comparing the fixed sized blocks with fixed sized blocks already stored on the backup computer system; and in response to the comparing step, storing changed blocks on the backup computer system as data blocks compatible with the backup computer system and discarding unchanged blocks.

38. A method for changing a file stored on a source and replicated on a destination system, the method comprising the steps of:

identifying modified files on the source;

writing the modified files from the source to the destination system;

reading, by the destination system, data blocks that correspond to blocks of the destination system;

comparing the data blocks read from the modified files with corresponding data blocks stored on the destination system; and in response to a particular data block read from the modified files not matching a corresponding data block on the destination file system, writing the particular data block to the destination system as data blocks compatible with the destination system.

39. A computer readable storage medium, including program instructions executing on a computer, the program instructions including instructions for performing the steps of:

writing whole file data from the source to a queue on the destination system;

reading, from the queue, data blocks that correspond to blocks of the destination system;

comparing the data blocks read from the queue with corresponding data blocks stored on the destination system; and in response to a particular data block read from the queue not matching a corresponding data block on the destination file system, writing the particular data block to the destination system as destination blocks compatible with the destination system.

40. The computer readable storage medium of claim 39 including further instructions for performing the steps of:

polling a replication agent on the source system, by the destination system; and identifying modified files on the source system, by the replication agent, in response to the polling.

41. A computer readable storage medium, including program instructions executing on a computer, the program instructions including instructions for performing the steps of:

checking, by a replication agent on the source system, for one or more modified files stored at the source system using a first file system;

creating, in response to detecting one or more modified files, a data stream comprising whole file data including the modified files and metadata comprising information related to the whole file data;

transmitting the data stream over a network to the destination system;

forming one or more data blocks compatible with storage on the destination system from the data stream;

comparing the formed data blocks to corresponding data blocks stored on the destination system, and if the comparing step indicates that a formed data block and its corresponding stored data block are not identical, then writing the formed data blocks to the storage in the destination system.

* * * * *